March 17, 1964     S. B. WELCH     3,125,659
AUTOMATIC OVEN CLEANING WITH CONSTANT HEATING CONDITIONS
Filed Dec. 18, 1961
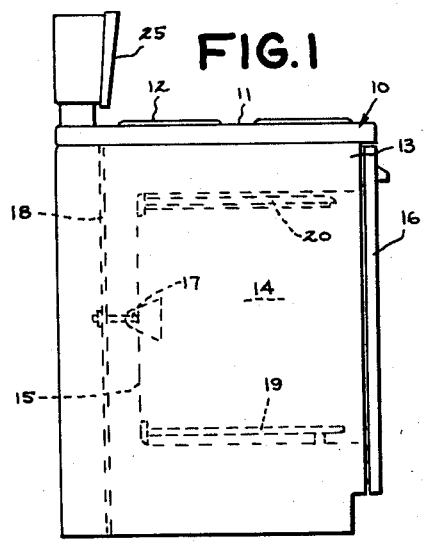
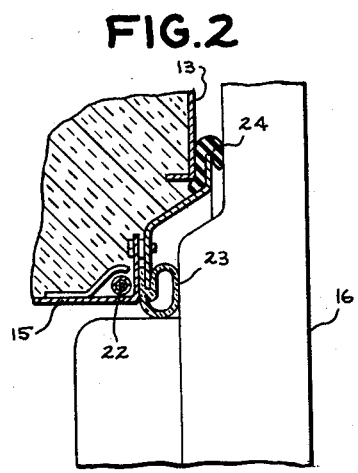
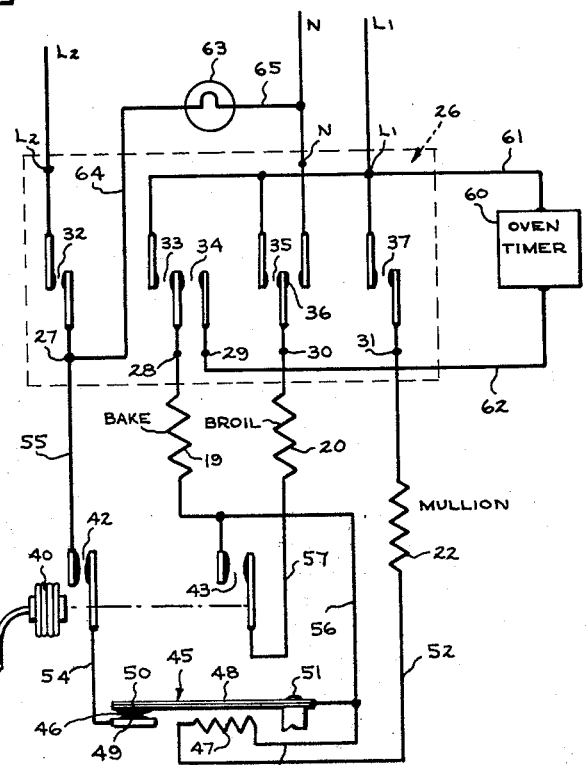
INVENTOR.
STANLEY B. WELCH
BY Richard L. Caslin
HIS ATTORNEY

# United States Patent Office 3,125,659
Patented Mar. 17, 1964

3,125,659
AUTOMATIC OVEN CLEANING WITH
CONSTANT HEATING CONDITIONS
Stanley B. Welch, Louisville, Ky., assignor to General Electric Company, a corporation of New York
Filed Dec. 18, 1961, Ser. No. 159,864
3 Claims. (Cl. 219—20)

The present invention relates to a control system for an electric oven, and particularly to an automatic cleaning oven of the type especially suited for domestic use in the kitchen.

Probably the major annoyance to the housewife when using the oven for cooking foods is the difficulty encountered in cleaning the walls of the oven liner after each use. During the normal cooking operations, food particles and grease spatter often drop on the hot oven surfaces where they are partially burned and give off offensive smoke and odors. Strong cleaning agents are available on the market for scrubbing this soil off of the oven liner but they require a strong rubbing action and it is a laborious menial task because of the difficulty of reaching and applying pressure at all areas of the oven liner.

An important engineering breakthrough was recently made in this art by the discovery of an automatic heat cleaning oven design which is described and claimed in the co-pending application of Bohdan Hurko, Serial No. 27,926, filed May 9, 1960, now abandoned in favor of the continuation-in-part application Serial No. 244,493 filed December 13, 1962 which application is assigned to the General Electric Company, the assignee of the present invention. In the Hurko invention the oven temperature is raised above the maximum cooking temperature of about 600° F. to a heat cleaning temperature of between 750° F. and 950° F. in the oven cavity, and this elevated temperature is held for a period of time sufficient to burn off the food soil.

One problem encountered during the development of an automatic cleaning oven is that the rather wide spread of supply voltage variations encountered throughout this country tends to interfere with optimum cleaning results. The cleaning cycle is designed to operate at a nominal voltage of about 236 volts. If the voltage is low, for example, 200 volts, the cleaning cycle would operate slowly for an extended period in order for the oven to reach the desired heat cleaning temperature. In some instances the oven temperature would never reach the desired degree. Similarly, a high voltage of, for example, 260 volts might allow the oven to heat at too rapid a rate so that the temperature would not be in the heat cleaning temperature range for a sufficient period to give a satisfactory cleaning performance.

The principal object of the present invention is to provide a temperature control system for a domestic oven having an automatic cleaning cycle where the system is effective in maintaining constant heating conditions during the cleaning cycle without affecting normal oven operations.

A further object of the present invention is to provide a control system for a domestic electric oven with an automatic cleaning cycle so as to maintain approximately constant average wattage in the control circuit for the heat cleaning cycle over a wide range of voltage variations which might be encountered in use throughout the country.

The present invention, in accordance with one form thereof, embodies an electrical control system having a plurality of electric heating elements with means to connect the elements to a source of electrical energy. Selector means are combined with the heating elements so as to be able to combine the elements in various circuit arrangements. A self-interrupting thermal relay means is combined with at least certain of the heating elements during one of the circuit combinations so that said one circuit combination will provide uniform heating conditions independently of variations in the supply voltage.

This invention has found its principal utility when combined in a domestic oven having a high temperature heat cleaning cycle for burning off the food soil that adheres to the inner wall surfaces of the oven liner. The oven contains a plurality of resistance heating elements some of which are used for normal cooking operations, while others are used for the heat cleaning cycle. Understandably some of the heating elements are used during both the cooking operations and the heat cleaning operations. This invention has not been found necessary for use during the normal cooking operations, therefore, it is so used that the relay means may be switched into operation only during the heat cleaning cycle so that the heating elements used during such a cycle are heated at essentially constant average wattage over a wide range of voltage variations.

My invention will be better understood from the following description taken in connection with the accompanying drawing and its scope will be pointed out in the appended claims.

FIGURE 1 is a left side elevational view of a free-standing electric range embodying the temperature control system of the present invention;

FIGURE 2 is a fragmentary cross-sectional view taken adjacent the front of the oven liner and showing the cooperation between the oven door and the front edge of the oven liner, as well as the use of a mullion heater for replenishing the heat lost through and around the door; and FIGURE 3 is a schematic representation of circuitry embodying the principles of the present invention.

Turning now to a consideration of the drawing and in particular to FIGURE 1, there is shown an electric range 10 having a top cooking surface 11 with a plurality of surface heating elements 12. The cooking surface 11 is fastened on a range body or cabinet structure 13 in which is built an oven 14 which is formed by a box-like oven liner 15 and a front-opening drop door 16. Heat insulating material (not shown) is packed around the outer sides of the oven liner 15 and the oven liner is shown supported in the cabinet by being pulled back against the edges of the front opening of the cabinet by tension bolts 17 that are supported from a back wall 18 of the range body.

Heat must be supplied to the oven 14 and for this I have adopted the standard resistance heating elements 19 and 20 which are commonly employed in electric ranges. Heating element 19 is a baking unit supported adjacent the bottom wall of the oven liner, while the element 20 is a broiling unit arranged adjacent the top wall of the oven liner. Both of these heating elements 19 and 20 are connected to lead wires from a source of voltage by means of suitable electrical connectors located adjacent the back wall of the oven liner 15 as will be well understood by those skilled in this art.

It has been found expedient to add a third resistance heating element in the form of a mullion heater 22 shown in FIGURE 2 in the vicinity of the door opening to compensate for heat lost through and around the door 16. This mullion heater 22 is a metal-sheathed heating element of a construction similar to elements 19 and 20. It encircles the front opening or collar of the oven liner 15 and is shown as being located externally of the oven liner although it will be understood by those skilled in this art that it could be assembled within the throat of the oven liner with a suitable trim member or guard placed thereover.

FIGURE 2 also shows a pair of door gaskets 23 and 24 which encircle the door opening and are sandwiched between the range body 13 and the oven door 16 when the door is closed as shown in FIGURE 2. The innermost gasket 23 is a woven asbestos member of tubular form, while the other gasket 24 is an extruded silicon rubber gasket, and they are both described and claimed in the beforementioned Hurko application.

Lastly, the necessary manual controls for both the surface heating elements 12 and the oven heating elements 19, 20 and 22 are located in the face of the control panel of a backsplasher 25 which is located along the back edge of the cooking surface 11 in a raised position for ready observation and manipulation as is well understood in this art.

The detailed description given above is explained for purposes of background information that will facilitate an understanding of the present invention. My invention is concerned with a system for controlling the temperature within the oven cavity 14. The principles of operation can best be understood with reference to the circuit diagram of FIGURE 3, wherein the three resistance heating elements 19, 20 and 22 are shown connected in a power circuit that is supplied from the usual single phase, 236 volts, alternating current, three-wire Edison service entrance that is commonly found in an adequately-wired residence. The three power supply wires are identified as line wires $L_1$ and $L_2$ and the neutral wire N, it being understood that there is an electrical potential of 236 volts across lines $L_1$ and $L_2$ and 118 volts across either lines $L_1$ or $L_2$ and the neutral wire N. These voltages are expressed as definite numbers, but it is well to remember that there is a wide variation in supply voltages not only in various parts of the country but in various parts of the same city that is supplied power from the same electric company. This is true because there are variations in voltage as the electric current leaves the power generating station, but a primary reason for low voltages is that actual voltage is lost in the power cable as the cables extend away from the source of power. When electric current flows through a wire it creates a certain amount of heat which is wasted power and may be looked upon as a mere nuisance or loss. However, this waste of power also causes a voltage drop so that the voltage across two wires is lower at the end than it is at the starting point. Accordingly, variations in the voltage having a nominal value of 236 volts might extend from about 200 volts to about 260 volts.

An oven selector switch 26 is interposed between the source of voltage and the heating elements in order to be able to vary the several circuit combinations which are available. The oven selector switch 26 has three line terminals identified as N, $L_1$ and $L_2$ to conform to the identifications of the supply wires bringing current to the switch. The selector switch 26 also has a series of load terminals identified as elements 27–31 inclusive. Finally, the selector switch 26 includes a plurality of co-operating electrical contact means 32–37 inclusive which are switched in and out of the different circuits for varying the circuitry of the heating elements.

The bake unit 19 is connected to load terminal 28, while broil unit 20 is connected to load terminal 30, and mullion heater 22 is connected to load terminal 31. The oven control system includes a hydraulic thermostat 40 which is shown diagrammatically as a bellows structure of a hydraulic thermostatic system. It will be understood by those skilled in this art that such a thermostat 40 includes a remote sensor (not shown) in the form of an elongated bulb or probe that would be located in heat transfer relation to the oven cavity and connected to the bellows 40 by a capillary tube 41. The bulb, tube and bellows form a closed system for containing a thermally responsive fluid, whereby the expansion and contraction of the fluid is a function of the temperature of the fluid. Hence, there is a direct relation between the temperature within the oven and the movement of the bellows 40 of the thermostat. This movement is transmitted to a pair of double-pole contacts 42 and 43 which control the energization of the bake and broil units 19 and 20 respectively during normal cooking operations, and the shutting off of the heat cleaning cycle when the maximum predetermined oven temperature is reached. A suitable thermostat construction for use with my system is described and claimed in a copending application of Raymond L. Dills, Serial No. 78,615, now Patent No. 3,096,420, which was filed on December 27, 1960 and is assigned to the General Electric Company, the assignee of the present invention.

Moreover, there is a self-interrupting thermal relay means 45 included in the circuit. This relay means 45 includes a pair of normally closed contacts 46, a heater winding 47, and a thermally responsive member 48 of bi-metallic or polymetallic blade construction supported in cantilever fashion. The pair of contacts 46 are represented by a fixed contact 49 and a movable contact 50. The movable contact 50 is supported on the free end of the bi-metal 48, while the fixed end of the bi-metal is supported as at 51. The heater winding 47 is positioned adjacent the blade 48 and in the illustrated embodiment is connected at one end in series with the mullion heater 22 by means of lead 52, while the other end of the heater winding 47 is joined to the normally-closed relay contacts 46 by means of lead 53 and bi-metal blade 48. In addition, the normally-closed relay contacts 46 are connected to line $L_2$ by means of selector switch contacts 32, lead 54, thermostat contacts 42 and lead 55. Bake unit 19 is likewise joined to the bi-metal member 48 by a lead 56. Lastly, the broil unit 20 is also connected to the bi-metal blade 48 by a lead 57 which is broken by the thermostat contacts 43. It should be appreciated that there might be instances when it would be more expedient to shunt the heater winding 47 across the mullion heater 22 so as to provide it with full line voltage rather than having the heater in series as shown in the diagram of FIGURE 3.

Tracing the various power circuits for the heating elements 19, 20 and 22, it is well to understand that there are four circuit combinations or settings in which the heating elements may be combined. These four circuit combinations are Bake, Timed Bake, Broil and Heat Clean.

For a baking operation, the bake unit 19 is operated at rated wattage at 236 nominal volts across lines $L_1$ and $L_2$, while at the same time the broil unit is operated at one-fourth rated wattage at 118 nominal volts across line $L_2$ and neutral wire N. For example, the circuit for the bake unit 19 extends from line $L_1$, hence line terminal $L_1$, through selector switch contacts 33, load terminal 28, bake unit 19, lead 56, bi-metal member 48, closed contacts 46, lead 54, closed thermostat contacts 42, lead 55, load terminal 27, selector switch contacts 32, line terminal $L_2$ and hence line $L_2$. These selector switch contacts 32 are common to all operative switch positions in that they are closed whenever a heating element is energized. Simultaneously with the energization of the bake unit 19 the broil unit 20 is energized from line $L_2$, through line terminal $L_2$, selector switch contacts 32, load terminal 27, lead 55, thermostat contacts 42, lead 54, closed relay contacts 46, bi-metal member 48, lead 56, thermostat contacts 43, lead 57, broil unit 20, load terminal 30, selector switch contacts 36, line terminal N and hence neutral wire N.

During the timed baking operation only the bake unit 19 is energized at 236 volts. Its circuit differs from the previous baking circuit in that instead of selector switch contacts 33 being closed, the selector switch contacts 34 are closed for joining to the line $L_1$ through the medium of an oven timer 60, that is connected by one lead 61 to line terminal $L_1$, and connected to selector switch contacts 34 through lead 62 and switch terminal 29.

During the broiling operation, the broil unit 20 is energized at rated wattage across line L₁ and L₂ at a nominal voltage of 236 volts. The completed circuit may be traced from line L₁, through line terminal L₁, through selector switch contacts 35, load terminal 30, broil unit 20, lead 57, thermostat contacts 43, lead 56, bi-metal blade 48, lead 46, lead 54, thermostat contacts 42, lead 55, load terminal 27, selector switch contacts 32 to line terminal L₂ and hence line L₂.

A small oven indicator lamp 63 is shown connected across load terminal 27 and line terminal N by means of leads 64 and 65 respectively. Accordingly, this lamp is energized whenever the oven selector switch 26 is closed which is the same condition as the selector switch contacts 32 being closed.

The operation of the heat cleaning cycle is as follows: the oven selector switch 26 is set in the heat cleaning position by closing switch contacts 32, 33, and 37 to connect both the bake unit 19 of 3200 rated watts and the mullion heater 22 of 800 rated watts in a parallel circuit between lines L₁ and L₂ and at a voltage of 236 nominal volts. Before the circuit is complete the thermostat 40 must also be set to a heat cleaning position which closes the thermostat contacts 42 and 43 so that they will only open when the oven air temperature reaches the predetermined maximum temperature which is between about 750° F. and 950° F. As mentioned previously the heater coil 47 of the thermal relay 45 is in series with the mullion heater 22 so that it is energized whenever the heat cleaning circuit is completed. The bi-metal blade 48 is heated mainly by the heater coil 47 whenever the heat cleaning circuit is energized. This applied heat causes the bi-metal blade to flex in the clockwise direction shown in the diagram of FIGURE 3 which tends to separate the movable contact 50 from the fixed contact 49 of the relay contacts 46. Upon opening of the relay contact 46, the heat cleaning circuit is deenergized so that the heater coil 47 is no longer heated but cools down thereby allowing the bi-metal 48 to return to its original normally-closed position wherein the electric contacts 49 and 50 are in a conducting relation to each other.

The resistance of the heater coil 47 is fixed; therefore, the heating effect of the coil varies as the square of the current, that is, at any instant is proportional to $I^2R$, or as the square of the voltage and the reciprocal of the resistance $E^2/R$. Understandably if the applied voltage is high, for example 260 volts, the heating effect of the coil 47 will be more rapid and the bi-metal blade 48 will be flexed out of its normally closed position for a greater proportion of the time than if the voltage were low, for example 200 volts. Accordingly, this thermal relay means 45 causes the heat cleaning circuit to cycle On and Off at varying ratios of On time versus Off time depending upon the supply of voltage to the circuit. Thus the relay means produces a succession of pulsations the effective voltage of which is substantially independent of variations in the supply voltage, thereby maintaining approximately constant average wattage in the heat cleaning circuit over a wide range of voltage variations. The net result of this is that the rate of heating during the heat cleaning cycle will be essentially constant. Accordingly, the same length of time would be taken for completing the heat cleaning cycle and uniform cleaning results would be the net result.

To repeat the problem that would exist in the absence of this invention, an extremely high supply voltage of, for example, 260 volts would raise the oven air temperature suddenly so that the maximum heat cleaning temperature would be reached in a short amount of time and the heat cleaning circuit would be de-energized quickly so that the oven would tend to cool down suddenly. For instance, in the case of 260 volts the oven heats from 800° to 900° in 10.7 minutes, and at 236 volts approximately 26.5 minutes are required for the same temperature rise. Hence, the oven temperature would not be within the heat cleaning range of, for example, 750° F. and 950° F. for an amount of time necessary to complete the burning off of the food soil lodged on the oven walls. The condition at the other extreme where there would be a low voltage of, for example, 200 volts would result in a very slow heating up of the oven and a possibility might exist that the predetermined maximum temperature would never be reached and the heat cleaning cycle would remain in operation indefinitely until the housewife were to change the oven control settings. In other words, the cycle would not be automatic as is described in the present invention because of the failure of the temperature to reach the predetermined maximum at which time the thermostat would ordinarily de-energize the circuit and allow the oven to cool down.

Having described above my invention of a temperature control system for a high temperature oven it will readily be apparent to those skilled in this art that I have devised an efficient and reliable means for maintaining constant heating conditions in an oven during a heat cleaning operation without affecting the normal oven operations.

Modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. A high temperature electric oven comprising an oven liner and a door that forms an oven cooking cavity, resistance heating means for said cavity including an upper heating element, a lower heating element and a third heating element co-extensive with at least part of the oven liner adjacent the door, circuit means for connecting said heating means to a source of electrical energy, a control system having a circuit selector means and a temperature control device for energizing the heating elements in various circuit arrangements, a self-interrupting thermal relay means operatively connected in a circuit network to at least the lower heating element and the third heating element adjacent the door when the oven temperature is to be raised to a heat cleaning temperature of between 750° and 950° F. so that said relay means serves as a watts controller and maintains substantially constant wattage in the controlled circuit network over a wide range of line voltage variations, said temperature control device serving to de-energize the circuit network and heating elements once the oven cavity temperature reaches the predetermined degree of temperature set by the device.

2. In a domestic oven including heat-insulating structure defining a cooking cavity therein having a front opening, a heat-insulated front door operatively associated with said front opening and selectively movable between open and closed positions with respect thereto, a source of electric power supply, and a heating circuit adapted to be completed to said power source to supply heat into said cooking cavity; the combination comprising a selector switch having an Off position and several On positions such as a bake position and a heat-clean position, said selector switch in its Off position interrupting said heating circuit, said selector switch in its On position preparing said heating circuit, a manually settable temperature control device having a variable bake position and a single heat-clean position, said temperature control device in its variable bake position correspondingly presetting a variable bake temperature for the cooking cavity in the normal cooking temperature range extending from about 150° F. to about 550° F., said temperature control device in its heat-clean position presetting a maximum heat-cleaning temperature located between the 750° F. and 950° F., a self-interrupting thermal relay means combined in a circuit network with the heating circuit and temperature control device when the selector switch is set to the heat-clean position, the thermal relay including a switching mechanism operative to open and close said prepared heating circuit in the heat-clean cycle, said switching mechanism cycling between open and closed positions at a variable rate depending upon the voltage applied across the relay, wherein the thermal relay serves as a wattage controller for the heating circuit during the heat-cleaning cycle to maintain a constant heating condition without affecting the normal baking cycle.

3. A high temperature electric oven comprising a cabinet structure enclosing a box-like oven liner that has an open front that is closed by a door where the oven liner and door form an oven cooking cavity, resistance heating means for said cavity and including an upper heating element, a lower heating element and a third heating element co-extensive with at least part of the oven liner adjacent the door for replenishing heat lost through and around the door, connection means for connecting said heating elements to a source of electrical energy, and a control system having selector means and circuit connections for energizing the heating elements in various circuit arrangements, the upper and lower heating elements being arranged in circuits for normal cooking operations having a maximum temperature of about 600° F., and a heat cleaning circuit that includes the third heating element and at least the lower heating element for raising the temperature to an amount between about 750° F. and 950° F. at which temperature food soil lodged on the walls of the oven cavity will be burned off and the oven will, in effect, be self-cleaning, a self-interrupting thermal relay means combined with the control system and including a heater means, a thermally responsive member and contact means whereby the contact means is operated by the thermally responsive member that is in cooperative relation with the said heater means, the heater means being electrically connected with the third heating element so that when the heat cleaning cycle is energized the relay means maintains substantially constant average wattage in the control circuit over a wide range of voltage variations.

References Cited in the file of this patent
UNITED STATES PATENTS

| | | |
|---|---|---|
| 2,435,530 | Candor | Feb. 3, 1948 |
| 2,500,061 | Clark | Mar. 7, 1950 |
| 2,685,636 | Vogelsberg | Aug. 3, 1954 |
| 2,728,842 | Turner | Dec. 27, 1955 |
| 2,906,845 | Turner | Sept. 29, 1959 |